United States Patent [19]

Sadler

[11] Patent Number: 5,128,865
[45] Date of Patent: Jul. 7, 1992

[54] METHOD FOR DETERMINING THE SEMANTIC RELATEDNESS OF LEXICAL ITEMS IN A TEXT

[75] Inventor: Victor Sadler, Hw Utrecht, Netherlands

[73] Assignee: Bso/Buro Voor Systeemontwikkeling B.V., Rh Utrecht, Netherlands

[21] Appl. No.: 487,649

[22] Filed: Mar. 2, 1990

[30] Foreign Application Priority Data

Mar. 10, 1989 [NL] Netherlands .......................... 8900587

[51] Int. Cl.$^5$ ............................................ G06F 15/38
[52] U.S. Cl. .................................................... 364/419
[58] Field of Search ................ 364/419, 200 MS File, 364/900 MS File

[56] References Cited

U.S. PATENT DOCUMENTS

| | | | |
|---|---|---|---|
| 4,703,425 | 10/1987 | Muraki | 364/419 |
| 4,750,122 | 6/1988 | Kaji et al. | 364/419 |
| 4,849,898 | 7/1989 | Adi | 364/419 |
| 4,931,935 | 6/1990 | Ohira et al. | 364/419 |
| 4,942,526 | 7/1990 | Okajima et al. | 364/419 |

OTHER PUBLICATIONS

IBM Journal of Research and Development, vol. 32, No. 2, Mar. 1988, pp. 185-193.
4e Congres "Reconnaissance des formes et intelligence artificielle", vol. II, Jan. 25-27, 1984.

Primary Examiner—Dale M. Shaw
Assistant Examiner—Xuong Chung
Attorney, Agent, or Firm—Bachman & LaPointe

[57] ABSTRACT

A method for determining the degree to which two or more lexical items belonging to a predefined corpus of text in any given language are semantically related to each other. The method involves a) the retrieval from the said text corpus of a set of sentences in which one or more of the given two or more lexical items appear, b) the parsing, with the aid of a suitable parsing system, of each of the sentences retrieved, in order to determine the syntactic dependency structure of each of the said sentences, c) for each sentence retrieved, determining from the obtained syntactic dependency structure the contextual relations which the given lexical items have in that sentence, i.e. identifying those items in the context which have a syntactic relation to those of the given lexical items which appear in the sentence concerned, together with the syntactic relations involved, d) determining, for each of the given lexical items, the total number of contextual relations found in step c), e) determining the number of contextual relations which the given lexical items have in common, f) determining, on the basis of the results obtained in steps d) and e), the degree of overlap between the contextual patterns of the given two or more lexical items.

2 Claims, No Drawings

METHOD FOR DETERMINING THE SEMANTIC RELATEDNESS OF LEXICAL ITEMS IN A TEXT

The invention concerns a method for determining the degree to which two or more lexical items (morphemes, words, collocations or phrases) belonging to a predefined text corpus in any given language are semantically related.

Knowledge of the semantic relations between two or more lexical items in a text has applications in various fields, including computer programs for word processing and programs for automatic translation of texts in one natural language into texts in another natural language.

Until now it has been customary to base the determination of semantic relatedness on information previously entered in a dictionary file. Such dictionary files contain identification codes which indicate, for each word in the dictionary, what semantic features that word has. Alternatively, a system of classification can be used to classify each word according to its semantic type, or the meaning of each word can be analysed into semantic components or primitives. Although such methods are widely applied by linguistics researchers they are highly labour-intensive and difficult to apply consistently on a large scale owing to subjective biases, which have a considerable influence on the determination of semantic relations by these methods.

The present invention has the aim of showing how the semantic relatedness of two or more lexical items can be determined automatically, without involving the personal judgement of the user.

This aim is achieved, according to the invention, through a method for determining the degree to which two or more lexical items belonging to a predefined text corpus in any given language are semantically related, comprising the following steps:
a) the retrieval from the said text corpus of a set of sentences in which one or more of the given two or more lexical items appear,
b) the parsing, with the aid of a suitable parsing system, of each of the sentences retrieved, in order to determine the syntactic dependency structure of each of the said sentences,
c) for each sentence retrieved, determining from the obtained syntactic dependency structure the contextual relations which the given lexical items have in that sentence, i.e. identifying those items in the context which have a syntactic relation to those of the given lexical items which appear in the sentence concerned, together with the syntactic relations involved,
d) determining, for each of the given lexical items, the total number of contextual relations found in step c),
e) determining the number of contextual relations which the given lexical items have in common,
f) determining, on the basis of the results obtained in steps d) and e), the degree of overlap between the contextual patterns of the given two or more lexical items.

As a result of this method an indication is obtained of the strength of the semantic relation between the given two or more lexical items. This allows a word processing program, an automatic translation program or any other such program to make an independent and automatic decision, and to carry out other processing steps on the basis of that decision.

Although there are a number of methods of statistical analysis which can be applied in order to compute the measure of semantic relatedness, the preferred method is to split step f) into two parts:
f1) determining the number of common contextual relations which can be expected by chance alone,
f2) comparing the number obtained by step f1) with the number obtained by step e).

The comparison in step f2) should preferably be performed by evaluating the following formula:

$$\text{semantic relatedness} = (C-E)/(C+K),$$

where
$C$ = the number of common contextual relations obtained by step e)
$E$ = the number of common contextual relations which can be expected by chance alone, as obtained by step f1)
$K$ = a constant.

Although the method according to the invention can in many cases yield good results even with a limited number of sentences extracted from the text corpus, it will usually be preferable to retrieve from the text corpus, in step a), all sentences in which one or more of the given lexical items appears. The degree of semantic relatedness between the given two or more lexical items can be determined with the highest degree of confidence when all the contextual relations of the said lexical items are taken into account, in other words when all sentences in which one or more of the given lexical items appears are retrieved from the text corpus.

The invention will now be described in greater detail with the aid of some examples of its application.

EXAMPLE 1

Measuring the semantic proximity or semantic distance between the words DISCARD and REMOVE As an example of the method according to the invention, in what follows the semantic proximity between two words is determined on the basis of a number of sentences extracted from an aircraft maintenance manual. In this example only a few sentences are used for each of the two key words, but it will be obvious that as many sentences as possible should be used in order to obtain reliable results, and that preferably the method should be based on all those sentences in the whole text corpus (in this case the whole maintenance manual), which contain one or both of the key words. In the present example the aim is to determine the semantic proximity between the words DISCARD and REMOVE. The following five sentences were retrieved from the corpus, all containing the word DISCARD:

[1] Remove and DISCARD the O-rings (9 and 12).
[2] Remove and DISCARD the split pins (18) and remove the nuts (17) and washers (16) from the clamp rods (11).
[3] DISCARD the gasket (9).
[4] Remove and DISCARD the two split pins which safety the autopilot cable end fittings (21).
[5] DISCARD the lockwire from the glandnuts (2).

With the identification and retrieval of these sentences, step a) of the method according to the invention has been partially completed. (The remaining part of step a) consists in the retrieval of a set of sentences containing the word REMOVE, and this part will be discussed below.) Next, as defined in step b) of the method, each of the sentences retrieved must be parsed with the aid of a suitable parsing system in order to determine the syntactic dependency structure of each sentence. Such syntactic analysers or parsers require no further explanation for a specialist in this field. For example, the last sentence of the above set might be converted by one of the known types of parser to a syntactic dependency tree with the following results:

```
[GOVERNOR, 'discard',
    [DIRECT-OBJECT, 'lockwire',
        [DETERMINER, 'the'],
        [PREPOSITIONAL-ADJUNCT, 'from',
            [PREPOSITIONAL-ARGUMENT, 'glandnuts',
                [DETERMINER, 'the'],
                [EPITHET, '(2)']]]]]
```

(The linguistic terms used in the above representation are assumed to be familiar to a specialist in this field and to need no further elucidation.)

The key word (or words, if both key words happen to occur in the same sentence) can now be extracted from this dependency structure, together with those elements of the context which have a direct relation to the key word (or words). For example, from the above dependency structure for sentence No. 5 it is possible to determine that the key word DISCARD has a direct relation to the word "lockwire", which is labelled "DIRECT-OBJECT". Such contextual relations can be extracted from the obtained dependency structure for each sentence in turn.

In addition, the dependency structures obtained are also searched for any indirect relation either of the key words may have to another word in its context via a function word such as a preposition or conjunction. In the dependency structure which would be obtained for sentence No. 1, for example, the key word DISCARD would be found to have an indirect relation to the other key word REMOVE via the conjunction AND.

The result obtained by tabulating all the relations which can be found for the above-mentioned key words in the syntactic dependency structures corresponding to the above sentences is as follows:

| Sentence | Relation | First word | Relation | Second word |
|---|---|---|---|---|
| 1 | 1 | remove | AND | discard |
| 1 | 2 | discard | OBJECT | ring |
| 2 | 1 | remove | AND | discard |
| 2 | 2 | discard | OBJECT | pin |
| 3 | 1 | discard | OBJECT | gasket |
| 4 | 1 | remove | AND | discard |
| 4 | 2 | discard | OBJECT | pin |
| 5 | 1 | discard | OBJECT | lockwire |

The number in the first column of each row in the above table shows the number of the sentence, corresponding to the numbers used in the above list of sentences, and the number in the second column shows the serial number of the relation found in the given sentence, in which one or both of the key words appear. It can be seen that in a few cases a relation exists between the two key words themselves.

A wholly identical procedure can now be followed for the second key word REMOVE. The following set of five sentences can be extracted from the manual for this purpose:

[1] Lift the loosened bus-bars (7) from the terminal studs (6) and REMOVE the contactor (14) from the interface (12).
[2] When power to main ac bus 1 (2) is REMOVEd, the following events occur.
[3] Do not REMOVE the nuts (5).
[4] REMOVE the lockwire and REMOVE the sensor connector (9) from the receptacle (10).
[5] REMOVE and discard the split pins (18) and REMOVE the nuts (17) and washers (16) from the clamp rods (11).

After each of these sentences has been subjected to structural analysis and the respective syntactic dependency structures have been obtained, the following relations can be extracted:

| Sentence | Relation | First word | Relation | Second word |
|---|---|---|---|---|
| 1 | 1 | lift | AND | remove |
| 1 | 2 | remove | OBJECT | contactor |
| 1 | 3 | remove | FROM | interface |
| 2 | 1 | remove | OBJECT | power |
| 3 | 1 | remove | OBJECT | nut |
| 4 | 1 | remove | OBJECT | lockwire* |
| 4 | 2 | remove | AND | remove* |
| 4 | 3 | remove | OBJECT | connector |
| 4 | 4 | remove | FROM | receptacle |
| 5 | 1 | remove | AND | discard |
| 5 | 2 | remove | OBJECT | pin* |
| 5 | 3 | remove | AND | remove* |
| 5 | 4 | remove | OBJECT | nut |
| 5 | 5 | remove | OBJECT | washer |
| 5 | 6 | remove | FROM | rod |

Here too, relations are found between the key word itself (REMOVE) and various other words, but also between REMOVE and the other key word DISCARD.

It also appears from the two tables above that both key words have common relations to identical words in their context, as shown in the second table by an asterisk. Thus, for instance, the word "pin" appears in the OBJECT relation both to DISCARD and to REMOVE.

A comparison of the above two tables clearly shows that identifying the syntactic relations in the context makes it possible to find meaningful similarities in the contextual patterns of semantically related words such as, in the present example, the words DISCARD and REMOVE.

Even with the limited number of sentences used in this example, a number of common contextual elements already appear. If the whole text is processed, and all the sentences are extracted in which at least one of the key words occurs, then the total number of common contextual elements will certainly increase. The more contextual relations the two key words have in common, the smaller will be the semantic distance between them, or, in other words, the stronger is the similarity or identity between the meanings or fields of reference of the two words. In accordance with the method as defined by the invention, statistical methods can now be applied to the above-mentioned lists of relations in order to arrive at a numerical measure of this semantic proximity.

This measure of semantic proximity should be a function of
(a) the number of contextual relations the words being compared have in common, and (b) the number of contextual relations which can be found, for each of the key words, in the selected set of sentences. (Ideally, the selected set of sentences should be equal to the total text corpus.)

Thus, in the above example the semantic proximity of the words DISCARD and REMOVE depends not only on the number of common relations, such as the OBJECT relation in which the word "pin" appears to both words, but also on the total number of contextual relations the words DISCARD and REMOVE have in the text corpus which serves as the source of lexical knowledge.

There are a large number of possible statistical methods of expressing the degree of semantic proximity between two words. The preferred method, however, is to compute the semantic relatedness mentioned in step f) by subtracting from the number of relations obtained in step e) the number which can be expected by chance alone, and then dividing the result by the number obtained in step e), increased by a constant. In other words, the formula applied is Semantic proximity $= (C-E)/(C+K)$, where
 $C =$ the number of common contextual relations
 $E =$ the number of such relations which can be expected by chance alone
 $K =$ a constant.

The number of relations to be expected on the basis of chance alone is in theory given by $E = A*B/f(N)$, where
 $A =$ the number of relations found for the first word,
 $B =$ the number of relations found for the second word,
 $f(N) =$ a function of the number of different relations, N, in the total corpus of text.

Suppose that for the word DISCARD in the present example a total of 300 contextual relations are found in the text, that for the word REMOVE a total of 500 relations are found, and that 50 of these relations are common to both words. Suppose further that for the function $f(N)$ of the number of different relations, N, in the corpus of text a value of 15000 has been established experimentally, and that for the constant K a value of 1 is chosen. The number of common relations to be expected on the basis of chance alone is determined by the above formula as:

$E = A*B/f(N) = 300*500/15000 = 10$.

In accordance with the first of the above formulae, a numerical value can now be obtained for the measure of semantic relatedness, or semantic proximity in this case, of the two words DISCARD and REMOVE:

proximity $= (C-E)/(C+K) = (50-10)/(50+1) = 0.784$.

The larger the number of common relations, and the smaller the expected number of relations, the closer the obtained value will approach unity.

In practice, computing the value of $f(N)$ will not be trivial because the distribution of the different contextual relations is not even, and because it is subject to various kinds of constraint, depending on the part of speech, for example. However, the value of $f(N)$ can also be set experimentally by choosing the value which yields the most acceptable results.

The value of K also depends on the application of the method. This constant has a normalizing effect, first and foremost. Adding the constant to the denominator of the above expression causes the semantic relatedness to be expressed by a number between zero and unity. On the other hand, this constant also has the effect of reducing the measure of semantic relatedness when this is based on a very low value of C (i.e. a value which indicates that the number of common relations is small). This effect can be useful for limiting the influence of chance coincidences. If the numbers are relatively small, then in general the conclusions which can be drawn from them will be less reliable.

It may also happen that no common contextual relations are found for the given lexical items, although a certain number of common relations would be expected on the grounds of chance alone. In that case the measure of semantic relatedness acquires a negative value. It is preferable in such cases to replace the term C in the denominator of the above expression with the term E, so that the values obtained will be normalized between zero and minus one. The formula then becomes:

relatedness $= (C-E)/(E+K)$.

Another possible way of expressing the degree of semantic relatedness between two words is to divide the number of common relations C by the sum of the total number of relations, A, found for the first word and the total number of relation, B, found for the second word. The result is a numerical value which expresses the semantic relatedness of the two words. In other words:

relatedness $= C/(A+B)$, where
 $A =$ the total number of relations for the first word,
 $B =$ the total number of relations for the second word,
 $C =$ the number of common relations.

This formula yields a value which, depending on the numbers involved, will lie between 0 and ½ for two key words, or between 0 and ⅓ for three key words. Since there is a theoretical upper limit for semantic relatedness (namely complete synonymity), it is convenient to again normalize the measure of relatedness between zero and unity, as in the preferred method discussed above. This can be done by multiplying the numerator in the above expression by the number of key words involved in the comparison. Thus, in general:

relatedness $=$ (number of key words) $C/(A+B)$.

Suppose once more that for the word DISCARD in the present example a total of 300 contextual relations are found in the text, that for the word REMOVE a total of 500 relations are found, and that 50 of these relations are common to both words. The numerical measure of semantic relatedness, or semantic proximity in this case, for the two words DISCARD and REMOVE is given by $2*50/(300+500) = 0.125$. The larger the number of common relations, the closer the measure of relatedness obtained approaches unity.

Such a measure of semantic distance or proximity can be applied in practice in the production of machine translations, for example. By way of illustration, the English word "smooth" and its various French translations will be considered. The word "smooth" has a number of possible equivalents in French, with clearly different meanings: "lisse", "uni", "poli", "doux", "insinuant".

In such cases as this, where a single word can be translated into another language in several different ways, with different meanings, it is common practice in conventional dictionaries to augment the entry in question with a number of codified contextual references, and to place these in a bilingual word list together with the relevant meanings or translations, e.g.:

smooth (leather) = lisse
smooth (road) = uni
smooth (glass) = poli
smooth (skin) = doux
smooth (talk) = insinuant The problem then is to deduce from the text being translated which of the meanings is appropriate in the current context and thus how the word in question is to be translated. For instance, if the word "smooth" appears in the combination "smooth path", the system needs to be able to decide which of the translations given in the dictionary is most appropriate, i.e. which translation of "smooth" fits best in the context of "path". In this example, the most appropriate French word will presumably be "uni". Now if a text corpus is searched using the method defined by the invention, a semantic proximity index can be worked out for each of the contextual examples in the dictionary, and this will show that, in view of the number of common relations found, there is a high degree of semantic proximity between the words "path" and "road", whereas the measure of proximity to the other dictionary examples will be much lower. On these grounds the system can decide that the French word "uni" is the correct translation of "smooth".

This example shows why the number of common relations must be considered in relation to the total number of relations found for each word. If words A and B have 50 relations in common, for instance, whereas words A and C have only 10 relations in common, then the conclusion can be drawn that A is closer in meaning to B than to C, always provided that the total number of relations found in the text is the same for B as for C. If, on the other hand, the totals are different, this factor must be taken into account. The finding of 10 common relations between A and C may be statistically more significant than the 50 common relations between A and B, if B is a high-frequency word such as "road" and C is a relatively rare word, e.g. "gasket".

EXAMPLE 2

Measuring the degree of semantic association between two words such as PRESSURE and VALVE Before this example is discussed in detail it must be pointed out that there is a difference between semantic association and semantic proximity, although both are types of semantic relatedness. The words PRESSURE and VALVE are certainly not similar in meaning, one word (pressure) referring to an abstract concept and the other (valve) referring to a concrete piece of equipment. The semantic distance between them should therefore be relatively large, i.e. the numerical measure of semantic proximity should be low. However, the method described above can also be successfully applied to determine the degree of semantic association instead of semantic distance or proximity, as will be illustrated below.

Just as in example 1, the two key words PRESSURE and VALVE are used to retrieve from a corpus of text that set of sentences in which at least one of the key words occurs. This time, however, only those sentences are retained in which both key words appear. Ten such sentences extracted from a sample text are shown below:

[1] A temperature-compensated PRESSURE switch, a fill VALVE and a safety device are installed on the bottle.

[2] The spool VALVE supplies PRESSURE to the hydraulic motor.

[3] If the isolation VALVE cuts off the PRESSURE to the system application of the brake is automatic.

[4] The PRESSURE goes through the second-stage poppet of the shutoff VALVE to the high PRESSURE ports of the spool VALVE.

[5] A PRESSURE relief-VALVE prevents an overpressure in the hydraulic system.

[6] A bleed-air regulating and relief VALVE controls the air-PRESSURE in the system reservoir.

[7] The off loader VALVE decreases the PRESSURE to 2750-3430 kPa (400-500 psi) if the hydraulic systems are not used.

[8] Two vacuum relief-VALVEs prevent a negative PRESSURE.

[9] The selector VALVE supplies oil PRESSURE to move the piston in the control cylinder.

[10] The system-accumulator nitrogen-lines connect the gas chamber of the system accumulator to its charging VALVE and its PRESSURE gage.

Again, each of these sentences must be analysed with the aid of a parsing system in order to establish the syntactic structure of each sentence. Once the syntactic structure is available, each of the structures can be examined in order to determine whether:

1) the two key words are directly connected to each other in the syntactic structure, or 2) the two key words are linked to each other by some intervening node.

The following table shows the kind of information which can be extracted from such structures after each of the sentences has been parsed and the corresponding parse structure has been established.

| 1 switch | ","         | valve + switch   | ATTRIBUTE | pressure |
|----------|-------------|------------------|-----------|----------|
| 2 supply | SUBJECT     | valve + supply   | OBJECT    | pressure |
| 3 cut    | SUBJECT     | valve + cut      | OBJECT    | pressure |
| 4 port   | OF          | valve + port     | ATTRIBUTE | pressure |
| 5 valve  | ATTRIBUTE   | relief + relief  | ATTRIBUTE | pressure |
| 6 control| SUBJECT     | valve + control  | OBJECT    | pressure |
| 7 decrease| SUBJECT    | valve + decrease | OBJECT    | pressure |
| 8 prevent| SUBJECT     | valve + prevent  | OBJECT    | pressure |
| 9 supply | SUBJECT     | valve + supply   | OBJECT    | pressure |
| 10 valve | AND         | gage + gage      | ATTRIBUTE | pressure |

As the table shows, the words PRESSURE and VALVE, although dissimilar in meaning, are nevertheless linked to each other by their relations to other words such as "switch", "supply", "cut", "port", "relief", "control", "decrease", "prevent" and "gage". Identifying these syntactic connections in the context makes it possible not only to estimate the degree or strength of association between any given words, but also to identify the kind of association involved. It is immediately clear from the above table that the dominating type of association is that in which VALVE is the subject, and PRESSURE the direct object, of some common verb. The actual verbs encountered in this relation in the above table are "supply", "cut", "control", "decrease" and "prevent", and these provide a clear characterization of the function of a valve with regard to pressure.

This potential application of the method according to the invention proves particularly valuable for making a choice in cases of ambiguity in collocations with an implicit relation, such as noun strings in English. In the above example it so happened that in the sentences retrieved, only indirect relations were found between the two key words, but a direct relation might well have been found in the corpus, as in the collocation "pressure valve". This would incidentally have strengthened the index of association between the two words. The explicit characterization of that association is obtained from the indirect connections shown above. Just as in example 1, the degree or strength of the association between two words can be numerically expressed as a function of the number of connecting relations found between the two words and as a function of the total number of relations for the words themselves.

The degree of semantic association, when expressed in a suitable form, also has a role to play in machine translation programs. This can be illustrated with the following example sentences:

[1] Remove the pins from the bandages.
[2] Remove the pins from the bolts.

If in the language into which these English sentences are to be translated (e.g. Dutch) it is necessary to clearly differentiate between different translations of the word "pin" (e.g. the Dutch word "speld", meaning a 'sharp-pointed fastener' in the first sentence, and Dutch "splitpen", meaning 'a kind of peg' in the second sentence), then in the course of translation a point will be reached at which a choice has to be made. The relation between the word "pin" and the word "remove" does not help in this case, because both kinds of pin can equally well be removed. The solution of the problem of word choice thus depends on establishing a link between one of the alternative translations of "pin" and the translation of "bandage", and between one of the alternative translations of "pin" and the translation of "bolt". In other words, the choice depends on the degree of association between the above-mentioned words as determined on the basis of the contextual patterns they exhibit in the target language (the language into which the text is being translated).

If the degree of this association is determined using the method according to the invention, it will appear that the Dutch word for "bandages" has a stronger association with the Dutch word "speld" than it does with the word "splitpen". On the other hand, the Dutch word for "bolts" will show a stronger association with the word "splitpen" than it does with the word "speld". Thus, on the basis of the strength of the observed association, a correct choice can be made for the translation of the ambiguous word "pin". The stronger the association between the relevant words, the greater the confidence with which this choice can be made.

I claim:

1. A method of selecting automatically the most appropriate translation, in a given target language, of a given lexical item in a given context in a given source language, comprising the following steps:

a) parsing, with the aid of a parsing system, an original sentence in which said given lexical item appears, in order to determine a syntactic structure of said sentence;

b) identifying, in said syntactic structure, those contextual relations which said given lexical item has in said sentence including identifying other lexical items in said sentence to which the given lexical item is syntactically related, and the syntactic relations involved;

c) retrieving said given lexical item, together with a set of alternative translations thereof, from a bilingual lexicon stored in electronic form, in which each of said alternative translations is associated with at least one contextual relation of said given lexical item in said given source language, with each said at least one contextual relation comprising a further lexical item and a syntactic relation;

d) comparing each of said contextual relations identified in step b) in said original sentence, with each contextual relation associated with one of said alternative translations retrieved in step c), including comparison of the syntactic relations involved;

e) for each of the comparisons performed in step d) in which said syntactic relations are found to be identical, determining a degree of semantic proximity between the given lexical item involved in the contextual relation identified in step b), and the further lexical item involved in the contextual relation retrieved in step c) by means of the following procedure:

1) identifying in a predefined text corpus in said source language a set of sentences in which at least one of said lexical items appear, and retrieving said set of sentences from said text corpus, 2) parsing, with the aid of said parsing system, each of said retrieved sentences in order to determine a syntactic structure of each of said sentences, 3) for each said sentence retrieved, determining from the obtained syntactic structure those contextual relations which said lexical items have in that sentence, 4) determining, for each of said lexical items, a total number of contextual relations found in step 3), 5) determining a number of contextual relations which said lexical items have in common, and 6) determining, on the basis of the results obtained in steps 4) and 5), a degree of overlap between the contextual relations of said lexical items, and thereby a degree of semantic proximity, or a degree of similarity, between said lexical items;

f) for each combination of a contextual relation identified in said original sentence in step b), and a contextual relation retrieved from said bilingual lexicon in step c) together with an associated translation, adding the result obtained in step e) to obtain a score representing the appropriateness of that translation; and g) selecting from said set of alternative translations retrieved in step c) that translation to which the highest score is attached at the conclusion of step f).

2. A method of selecting automatically the most appropriate translation, in a given target language, of a given lexical item in a given context in a given source language, comprising the following steps:

a) parsing, with the aid of a parsing system, an original sentence in which said given lexical item appears, in order to determine a syntactic structure of said sentence;

b) identifying, in said syntactic structure, those contextual relations which said given lexical item has in said sentence, including identifying other lexical items in said sentence to which the given lexical item is syntactically related, directly or indirectly via another lexical item, together with the syntactic relations involved;

c) retrieving the given lexical item, together with a set of alternative translations thereof, from a bilingual lexicon stored in electronic form;

d) retrieving from said bilingual lexicon each of the other syntactically related lexical items identified in step b), together with a set of alternative translations thereof;

e) identifying in a predefined text corpus in said target language a set of sentences containing at least one of said alternative translations retrieved in steps c) and d), and retrieving said set of sentences from said text corpus;

f) parsing, with the aid of said parsing system, each of said sentences retrieved in step e), in order to determine a syntactic structure for each of said sentences, g) for each sentence parsed in step f), determining from the determined syntactic structure those contextual relations which said alternative translations have in that sentence;

h) determining, for each of said alternative translations, a total number of contextual relations found in step g);

i) for each combination of one of said alternative translations of said given lexical item, retrieved in step c), with one of said alternative translations of the other lexical items, retrieved in step d), determining a degree of semantic association by means of the following procedure:

1) identifying in said set of sentences retrieved in step e) a subset of sentences which contain said combination, and in which members of said combination are syntactically related to each other directly or indirectly via another lexical item, 2) determining a total number of sentences in said subset identified in step 1), and 3) determining, on the basis of the results obtained in step h), a statistical significance of the result obtained in step 2), and thereby determining the degree of semantic association between the members of said combination, j) for each combination defined in step i), adding the result obtained in step i) to a score representing the appropriateness of that translation of said given lexical item; and k) selecting from said set of alternative translations retrieved in step c) that translation to which the highest score is attached at the conclusion of step j).

* * * * *